United States Patent
Rekewitz et al.

(10) Patent No.: US 6,671,610 B2
(45) Date of Patent: Dec. 30, 2003

(54) PROCESS AND DEVICE FOR ELECTRONICALLY CONTROLLING ACTUATORS OF A COMBUSTION ENGINE WITH VARIABLE GAS EXCHANGE CONTROL

(75) Inventors: Gert Rekewitz, Holzkirchen (DE); Gerd Kraemer, Baierbrunn (DE); Georg Meder, Munich (DE); Tim Beattie, Leamington Spa (GB)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 286 days.

(21) Appl. No.: 09/844,663

(22) Filed: Apr. 30, 2001

(65) Prior Publication Data

US 2002/0004696 A1 Jan. 10, 2002

(30) Foreign Application Priority Data

Apr. 29, 2000 (DE) .......................... 100 21 132

(51) Int. Cl.⁷ .............................. G06F 19/00; F01L 1/34
(52) U.S. Cl. ...................... 701/102; 701/110; 701/115; 123/90.15
(58) Field of Search ................................. 701/102, 115, 701/110, 106; 123/435, 436, 90.15, 90.11

(56) References Cited

U.S. PATENT DOCUMENTS 5,103,780 A * 4/1992 Ishii ........................ 123/90.15
5,889,205 A * 3/1999 Treinies et al. ............ 73/118.2

FOREIGN PATENT DOCUMENTS

| DE | 4325902 | 2/1995 | |
|---|---|---|---|
| DE | 19753969 | 6/1999 | |
| DE | 19844086 | 11/1999 | |
| DE | 19844085 | 3/2000 | |
| EP | 0445555 | 2/1991 | |
| EP | 0651149 | 10/1994 | |
| JP | 2001-355463 | * 12/2001 | ........... F02D/13/02 |

* cited by examiner

Primary Examiner—Hieu T. Vo
(74) Attorney, Agent, or Firm—Crowell & Moring LLP

(57) ABSTRACT

In a process and a device for electronically controlling actuators of a combustion engine with variable gas exchange control using a suction pipe pressure model where the connection between the cylinder filling level and the suction pipe pressure is described by a straight line with gradient and offset, the gradient and/or offset are determined as a function of the valve overlap surface. Preferably, the gradient and/or the offset are also determined as a function of the position of the valve overlap surface. The position of the valve overlap surface can be determined by the interval between the center of gravity of the valve overlap surface and a reference crankshaft angle. This improves the control of a combustion engine in motor vehicles with a gas exchange control (for example, with variable cam shaft rotation and/or cam shaft switchover to phaseless change of the valve control time and/or the valve stroke) with a view to accuracy and flexibility.

9 Claims, 2 Drawing Sheets

PROCESS AND DEVICE FOR ELECTRONICALLY CONTROLLING ACTUATORS OF A COMBUSTION ENGINE WITH VARIABLE GAS EXCHANGE CONTROL

BACKGROUND AND SUMMARY OF THE INVENTION

This application claims the priority of German Application No. 100 21 132.1, filed Apr. 29, 2000, the disclosure of which is expressly incorporated by reference herein.

This invention relates to a process and a device for electronically controlling actuators of a combustion engine having variable gas exchange control via suction pipe pressure model.

Such a process and such a device for electronically controlling actuators of a combustion engine with variable gas exchange control are known particularly from German Patent document DE 43 25 902 A1. Actuators of combustion engines are, for example, a throttle valve, injection valves and at least a servomotor for cam shaft rotation and/or cam shaft switchover. An example of a cam shaft rotation and/or a cam shaft switchover for the phaseless change of the valve control time and the valve stroke is described on pages 246 and 247 of the technical book entitled "Autoelektrik, Autoelektronik am Ottomotor" [Autoelectrics, Autoelectronics on the Spark Ignition Engine], Bosch, VDI Publishers, 1994. The change in the valve stroke is also known by the term "variable valve drive." The change in the valve control times (especially the opening times of the inlet and/or outlet valves related to the crankshaft angle) is also known by the term "variable cam shaft adjustment." In the future, control time and valve stroke changes in combustion engines are preferably to be superposed.

In such combustion engine systems, one thing is important: either the correct calculation of the cylinder filling state as a function of the momentary suction pipe pressure, in particular for the calculation of the fuel injection volume, or the correct calculation of the suction pipe pressure needed to attain a required cylinder filling level, whose pressure is set by means of the throttle valve. In that regard, German Patent document DE 43 25 902 A1 also discloses a so-called suction pipe pressure model where the connection between the cylinder filling level and the suction pipe pressure is described by a straight line with a gradient and offset. There, the gradient and the offset are determined especially as a function of the valve overlap, that is to say, the crankshaft angle area over which an inlet valve and an outlet valve of a cylinder are opened together. This process, however, is too inaccurate, particularly in case of a superposition of the control time and valve stroke changes.

It is therefore an object of the present invention to improve upon a process or a device of the above-mentioned type with a view to the accuracy and flexibility of the control measures.

This problem is solved by providing a process and device for electronically controlling actuators of a combustion engine with variable exchange control by the use of a suction pipe pressure model, where the connection between the cylinder filling level and the suction pipe pressure is described by a straight line with a gradient and an offset. The gradient (K) and/or the offset (p0) are determined as a function of the valve overlap surface (Fü).

The invention is based on the novel realization that the suction pipe pressure model can be retained, but becomes independent of the type of gas change control when the gradient and/or the offset of the straight line that is the basis of the suction pipe pressure model is determined as a function of the valve overlap surface. The invention-based control becomes particularly accurate when one considers, in connection with the valve overlap surface, also the latter's position, particularly with regard to a defined crankshaft angle.

On the basis of the present invention, when using the known suction pipe pressure model in spite of expanded combustion engine functions, one need not take into consideration whether a valve stroke change, a control time change or both are to be performed. Furthermore, one need not consider whether the outlet valves, the inlet valves or both types of valves are influenced. This makes for a simple but flexible system.

Other objects, advantages and novel features of the present invention will become apparent from the following detailed description of the invention when considered in conjunction with the accompanying drawings.

DETAILED DESCRIPTION OF THE DRAWINGS

Figure 1:
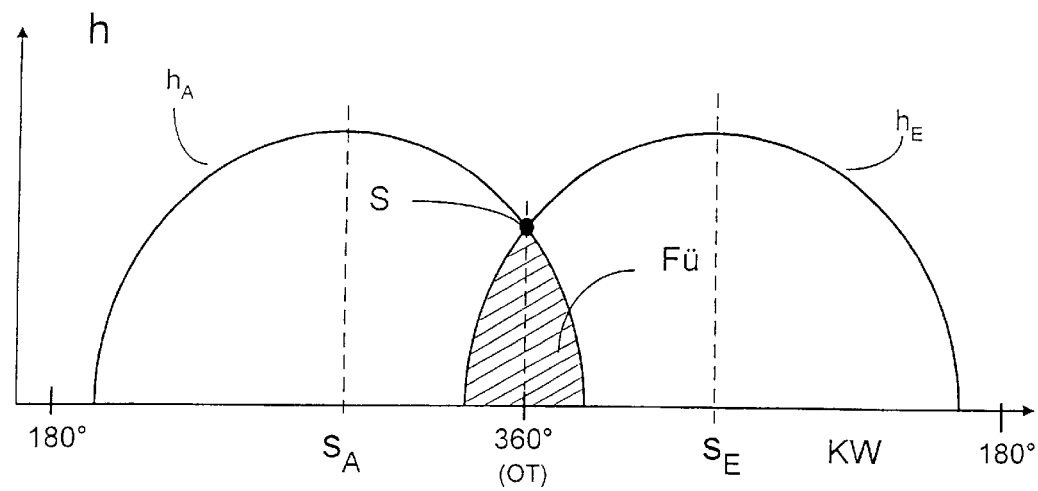
FIG. 1 is a graph showing the valve stroke curve for a gas exchange control without valve stroke change.
Figure 2:
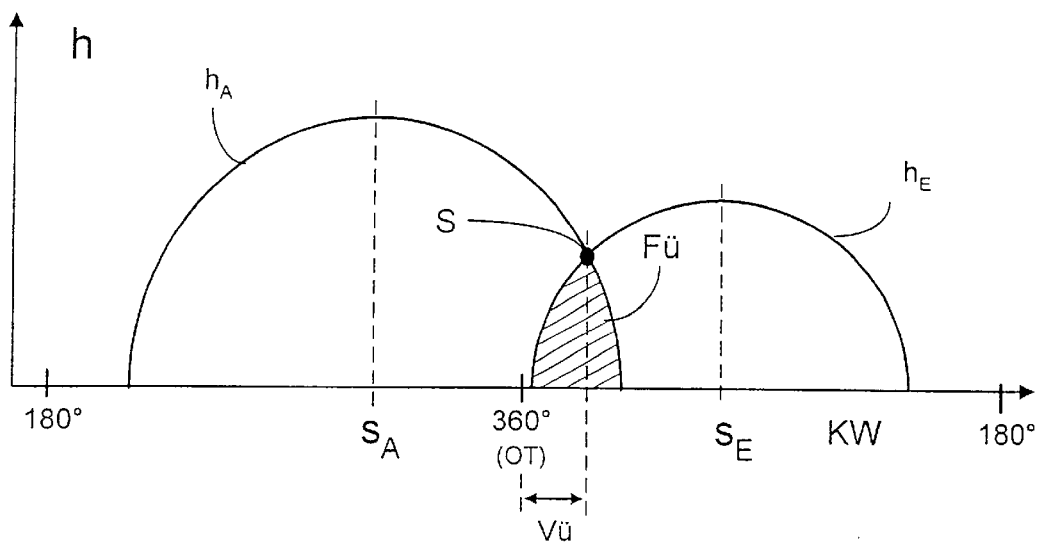
FIG. 2 is a graph showing the valve stroke curve for a gas exchange control with valve stroke change.

In FIGS. 1 and 2, the crankshaft angle KW is plotted on the abscissa and the valve stroke h is plotted on the ordinate. FIGS. 1 and 2 show the valve stroke curves $h_A$ and $h_E$ of the outlet valve and of the inlet valve of a cylinder, respectively.

The valve overlap surface Fü is the intersecting surface (see cross-hatching) of the two surfaces that are enclosed by the valve stroke curves $h_A$ and $h_E$ as well as the abscissa. The location of the valve overlap surface Fü is determined by the interval Vü of the center of gravity S of the valve overlap surface Fü with respect to a reference crankshaft angle, here the so-called top dead center OT position. The top dead center OT is found with a crankshaft angle KW of 360°. The center of gravity S of the valve overlap surface Fü corresponds to the point of intersection of the valve stroke curves $h_A$ and $h_E$.

It is immaterial for the invention whether one performs only a valve control time change, as illustrated in FIG. 1, or whether one possibly additionally performs a valve stroke change, as illustrated in conjunction with the inlet valve in FIG. 2.

Figure 3:
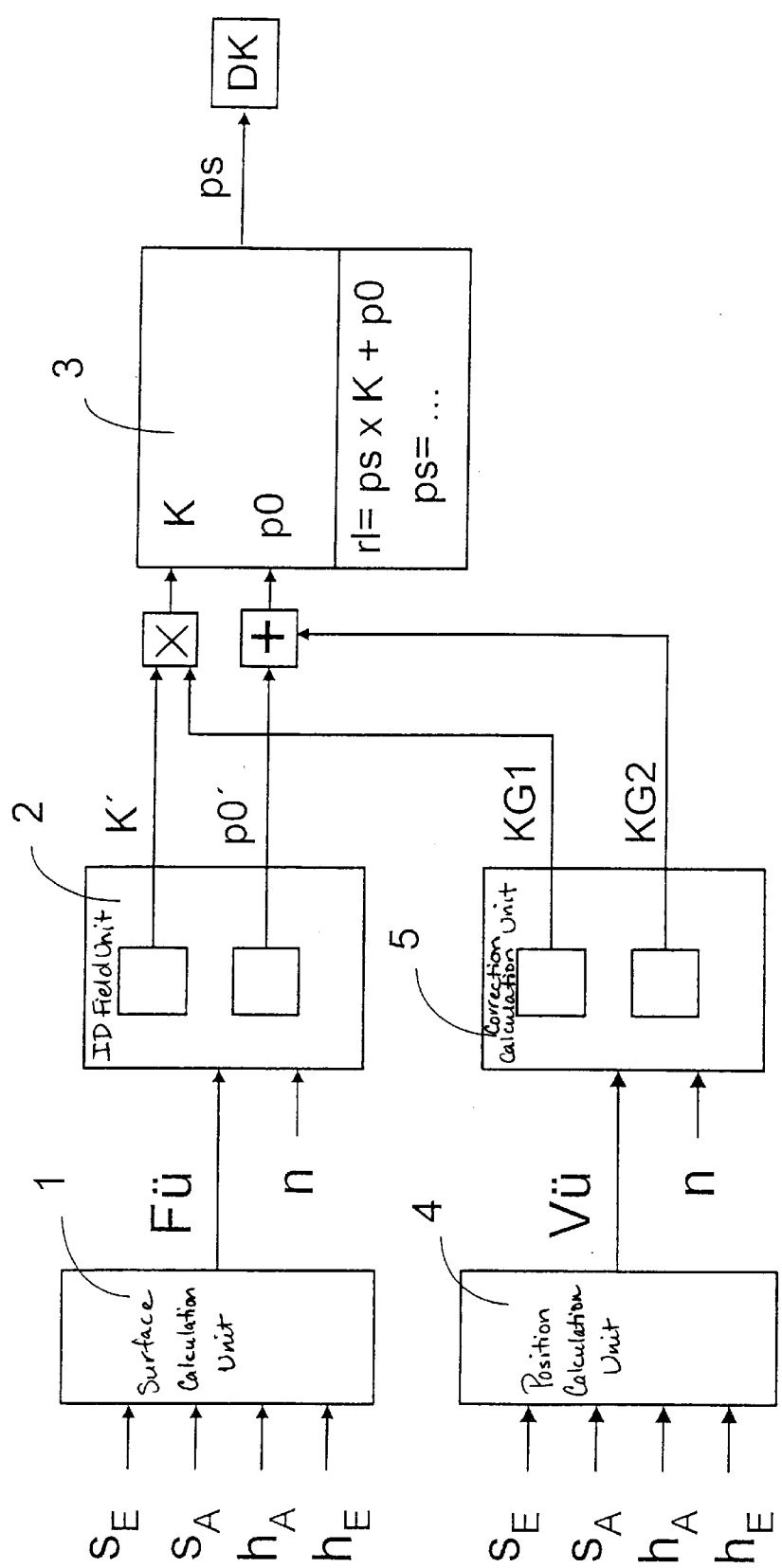
FIG. 3 is a block diagram showing a possible embodiment of the invention-based process that, for example, can be integrated in an already present combustion engine electronic control unit.

FIG. 3 shows an exemplary embodiment of the invention-based process and the invention-based device as part of a control unit (not illustrated here).

Basically, we start with the known suction pipe pressure model describing a straight line:

$$rl = ps \times K + p0,$$

where rl is the cylinder filling level, ps is the suction pipe pressure,

K is the gradient of the straight line and p0 is the offset of the straight line.

(See also FIG. 2 in German Patent document DE 43 25 902 A1).

In the invention-based exemplary embodiment, the gradient K and the offset p0 are determined as a function of the valve overlap surface Fü and the position of the valve overlap surface Fü. The position of the valve overlap surface Fü is determined by the interval Vü of the center of gravity S of the valve overlap surface Fü, with respect to the crankshaft angle 360° (=OT) (see FIG. 1 and FIG. 2).

The inlet spread $s_E$, the outlet spread $s_A$, the inlet valve stroke $h_E$ and the outlet valve stroke $h_A$ are input signals of the surface calculation unit 1 and the position calculation unit 4. By "spread ($s_E$, $s_A$)" is meant especially the crankshaft angle KW at the particular maximum of the valve stroke curves $h_A$ and $h_E$. The inlet spread $s_E$ and the outlet spread $s_A$ are used, for example, with relation to the reference crankshaft angle at OT as a measure of the change of the valve control times. As a function of these input signals, first the valve overlap surface Fü is determined, for example, by means of the surface calculation method according to Hardenberg. Besides, the position of the valve overlap surface Fü is determined as a function of those same input signals. The position of the valve overlap surface Fü is defined as the interval Vü of the surface center of gravity S from the crankshaft angle KW that is associated with the top dead center OT position (FIG. 1, FIG. 2).

The valve overlap surface Fü and the number of rotations n of the combustion engine are input signals of an identification field unit 2 whose output signals are a basic gradient value K' and a basic offset value p0'.

The position of the valve overlap surface Fü in the form of the interval Vü and the number of rotations of the combustion engine are input signals of the correction, calculation unit 5 whose output signals are a gradient-related correction factor KG1 and an offset-related correction value KG2.

The gradient-related correction factor KG1 is multiplied by the basic gradient valve K'. The result of this multiplication is the gradient K of the straight-line equation of the suction pipe pressure model. The offset-related correction valve KG2 is added to the basic offset value p0'. The result of this addition is the offset p0 of the straight-line equation of the suction pipe pressure model.

A suction pipe pressure model is deposited in the pressure calculation unit 3 in the form of the above-mentioned straight line. In case of a predetermined required cylinder filling level rl, the equation is solved for the suction pipe pressure ps. Then the throttle valve DK is so energized that this suction pipe pressure ps is attained.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for electronically controlling actuators of a combustion engine having variable gas exchange control, the device comprising:
   a control unit storing a suction pipe pressure model wherein a connection between a cylinder filling level and a suction pipe pressure is described via a straight line with a gradient and an offset; and
   a gradient and/or offset determination unit which determines the gradient and/or the offset as a function of a valve overlap surface between an inlet and outlet valve of the combustion engine.

2. The device according to claim 1, further comprising a gradient and/or offset determination unit that determines the gradient and/or offset additionally as a function of the position of the valve overlap surface.

3. The device according to claim 2, further comprising a valve overlap surface position determining unit which determines the position of the valve overlap surface by an interval of a center of gravity of the valve overlap surface with respect to a reference crankshaft angle.

4. A computer product comprising a computer readable medium having stored thereon program code segments that:
   describe a connection between a cylinder filling level and a suction pipe pressure via a straight line having a gradient and an offset for electronically controlling actuators of a combustion engine with a variable exchange control by using a suction pipe pressure model; and
   determine the gradient and/or offset as a function of a valve overlap surface between an inlet and outlet valve of the combustion engine.

5. The computer product according to claim 4, further comprising a program code segment that determines the gradient and/or the offset independently of a position of the valve overlap surface.

6. The computer product according to claim 5, further comprising a program code segment that determines the position of the valve overlap surface via an interval of a center of gravity of the valve overlap surface with respect to a reference crankshaft angle signal.

7. A process for electronically controlling actuators of a combustion engine having variable exchange control using a suction pipe pressure model, the process comprising the acts of:
   describing a connecting between a cylinder filling level and a suction pipe pressure using a straight line having a gradient and an offset; and
   determining at least one of the gradient and offset as a function of a valve overlap surface between an inlet valve and an outlet valve of the combustion engine.

8. The process according to claim 7, wherein the act of determining further comprises the act of determining the at least one of the gradient and the offset independently of a position of the valve overlap surface.

9. The process according to claim 8, wherein the position of the valve overlap surface is determined by an interval of a center of gravity of the valve overlap surface with respect to a reference crankshaft angle.

* * * * *